US011663623B2

(12) United States Patent
Goto et al.

(10) Patent No.: US 11,663,623 B2
(45) Date of Patent: May 30, 2023

(54) PREDICTION METHOD, PREDICTION DEVICE, AND COMPUTER-READABLE RECORDING MEDIUM

(71) Applicant: FUJITSU LIMITED, Kawasaki (JP)

(72) Inventors: Keisuke Goto, Kawasaki (JP); Tatsuya Asai, Kawasaki (JP); Kotaro Ohori, Chuo (JP); Yoshinobu Shiota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/875,250

(22) Filed: May 15, 2020

(65) Prior Publication Data

US 2020/0364744 A1 Nov. 19, 2020

(30) Foreign Application Priority Data

May 17, 2019 (JP) .............................. JP2019-093717

(51) Int. Cl.
*G06Q 30/02* (2023.01)
*G06Q 30/0242* (2023.01)
*G06Q 30/0202* (2023.01)
*G06Q 30/0241* (2023.01)
(Continued)

(52) U.S. Cl.
CPC ....... *G06Q 30/0246* (2013.01); *G06F 18/214* (2023.01); *G06N 20/00* (2019.01); *G06Q 30/0202* (2013.01); *G06Q 30/0277* (2013.01)

(58) Field of Classification Search
CPC ........... G06Q 30/0246; G06Q 30/0202; G06Q 30/0277; G06N 20/00; G06K 9/6256
See application file for complete search history.

(56) References Cited

U.S. PATENT DOCUMENTS 8,321,274 B2 * 11/2012 Collins .............. G06Q 30/0255
705/14.42
9,344,507 B2 * 5/2016 Hashimoto ........... G06F 15/173
9,754,283 B2 * 9/2017 Guo .................... G06Q 30/0249
(Continued)

FOREIGN PATENT DOCUMENTS

JP 2015-028732 2/2015

OTHER PUBLICATIONS

Dam, 2013.*
(Continued)

*Primary Examiner* — Michael I Ezewoko
(74) *Attorney, Agent, or Firm* — Staas & Halsey LLP

(57) ABSTRACT

A non-transitory computer-readable recording medium stores therein a prediction program that causes a computer to execute a process including obtaining a machine learning model trained by using training data, the machine learning model predicting presence or absence of purchase actions or predetermined actions of users corresponding to feature information on the users, the training data including feature information on users and information indicating the presence or the absence of the purchase actions of commercial products or the predetermined actions, receiving input of a budget amount in an entry field displayed on a display in association with a user group including users including a common feature in the feature information, and displaying, in association with the budget amount on the display, feature information on the users included in the user group corresponding to the entry field.

6 Claims, 16 Drawing Sheets

(51) Int. Cl.
  *G06N 20/00*     (2019.01)
  *G06F 18/214*    (2023.01)

(56) References Cited

U.S. PATENT DOCUMENTS

| | | | | |
|---|---|---|---|---|
| 10,636,053 | B2* | 4/2020 | Masson | G06Q 30/0254 |
| 10,671,680 | B2* | 6/2020 | Yan | G06Q 50/01 |
| 11,036,811 | B2* | 6/2021 | Modarresi | G06F 16/951 |
| 2018/0025060 | A1* | 1/2018 | Sasaki | G06F 16/9535 |
| | | | | 707/734 |
| 2018/0336476 | A1* | 11/2018 | Fujimaki | G06N 20/10 |
| 2018/0365521 | A1* | 12/2018 | Dai | G06N 7/00 |
| 2019/0205931 | A1* | 7/2019 | Shapiro | G06F 16/9535 |

OTHER PUBLICATIONS

Edelman, 2008.*
Goffman, 1974.*
Grier, 2005_.*
Hayles, 2005_.*
Kapoor, 2010.*
Kuhn, 1962.*
Lakoff, 1980.*
Mindell, 2015.*
Treffert, 2010.*
Wirth, 1976.*
NPL, Safoury, 2013, LNSE, pp. 303-307.*

* cited by examiner

FIG.2

| USER ID | GENDER | AGE | NUMBER OF TIMES OF ACCESS | ADVERTISEMENT DISTRIBUTION TIME ZONE | PLACE OF RESIDENCE | ... | CV |
|---|---|---|---|---|---|---|---|
| U001 | FEMALE | YOUNG PERSON | 10TIMES | MORNING | CAPITAL AREA | ... | NOT CV |
| U002 | MALE | MIDDLE-AGED PERSON | 20TIMES | AFTERNOON | HOKKAIDO | ... | CV |
| U003 | FEMALE | ELDERLY PERSON | 5TIMES | EVENING | TOKAI | ... | CV |
| ... | ... | ... | ... | ... | ... | ... | ... |

FIG.3

| IMPORTANCE DEGREE | CONDITION OF EXPLANATORY VARIABLE |
|---|---|
| 20 | GENDER=MALE ∧ NUMBER OF TIMES OF ACCESS≧20 ∧ PLACE OF RESIDENCE=HOKKAIDO |
| ... | ... |
| -40 | GENDER=FEMALE ∧ ADVERTISEMENT DISTRIBUTION TIME ZONE=MORNING ∧ PLACE OF RESIDENCE=HOKKAIDO |
| ... | ... |

| IMPORTANCE DEGREE | VARIABLE |
|---|---|
| 0.91 | REMAINING BUDGET |
| 0.78 | DAY |
| 0.65 | NUMBER OF CLICKS |
| ... | |
| 0.03 | TIME ZONE |
| 0.02 | JUST BEFORE |
| ... | |

| GROUP ID | CLASSIFICATION CONDITION |
|---|---|
| G001 | GENDER=FEMALE∧PLACE OF RESIDENCE=HOKKAIDO |
| G002 | GENDER=MALE∧PLACE OF RESIDENCE=HOKKAIDO |
| ... | ... |
| G008 | PLACE OF RESIDENCE=CAPITAL AREA∧AGE=YOUNG PERSON |

FIG.10

| GROUP | ACTUAL PERFOR-MANCE CV RATE | ACTUAL PERFORMANCE CLICK RATE (PER 1 YEN) | BUDGET ALLOCA-TION | PREDIC-TION NUMBER OF CLICKS | PREDIC-TED CV RATE | PREDIC-TION NUMBER OF CVs |
|---|---|---|---|---|---|---|
| GROUP1 | 1/10 | 3 | 1000 | 3000 | 1/3 | 1000 |
| GROUP2 | 1/5 | 5 | 2000 | 10000 | 1/2 | 5000 |
| GROUP3 | 1/10 | 2 | 4000 | 8000 | 1/10 | 800 |
| GROUP4 | 1/30 | 4 | | | 1/100 | |

PREDICTION METHOD, PREDICTION DEVICE, AND COMPUTER-READABLE RECORDING MEDIUM

CROSS-REFERENCE TO RELATED APPLICATION

This application is based upon and claims the benefit of priority of the prior Japanese Patent Application No. 2019-093717, filed on May 17, 2019, the entire contents of which are incorporated herein by reference.

FIELD

The embodiment discussed herein is related to a prediction method, a prediction device, and a computer-readable recording medium.

BACKGROUND

There has been known a technique of optimizing advertisement publication. Specifically, in digital marketing, budget allocation may be optimized based on an analysis result of log data. Examples of such a related technique are described in Japanese Laid-open Patent Publication No. 2015-028732.

SUMMARY

According to an aspect of an embodiment, a non-transitory computer-readable recording medium stores therein a prediction program that causes a computer to execute a process including: obtaining a machine learning model trained by using training data, the machine learning model predicting presence or absence of purchase actions or predetermined actions of users corresponding to feature information on the users, the training data including feature information on users and information indicating the presence or the absence of the purchase actions of commercial products or the predetermined actions; receiving input of a budget amount in an entry field displayed on a display in association with a user group including users including a common feature in the feature information; and displaying, in association with the budget amount on the display, feature information on the users included in the user group corresponding to the entry field, the budget amount inputted in the entry field, a prediction number of clicks to an advertisement page of the commercial products, and a predicted frequency of occurrence that is a frequency of occurrence of the purchase actions or the predetermined actions calculated based on a predicted occurrence rate, the predicted occurrence rate being an occurrence rate of the purchase actions or the predetermined actions calculated by using the machine learning model.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of log data;

FIG. 3 is a diagram illustrating an example of hypothesis information;

FIG. 4 is a diagram illustrating an example of variable information;

FIG. 5 is a diagram illustrating an example of group information;

FIG. 10 is an explanatory view illustrating relation between variables and data;

DESCRIPTION OF EMBODIMENTS

However, in the technique described above, it may be difficult to make optimization of budget allocation more efficient. For example, in the related method, when budget is allocated, it may be difficult to obtain estimation of the number of conversions (CVs) for each advertisement and whether the budget allocation is optimized is unlikely to be estimated.

Preferred embodiments will be explained with reference to accompanying drawings. It is noted that this embodiment is not intended to limit the present invention. The embodiment can be combined without departing from the scope of the present invention.

Functional Configuration

Figure 1:
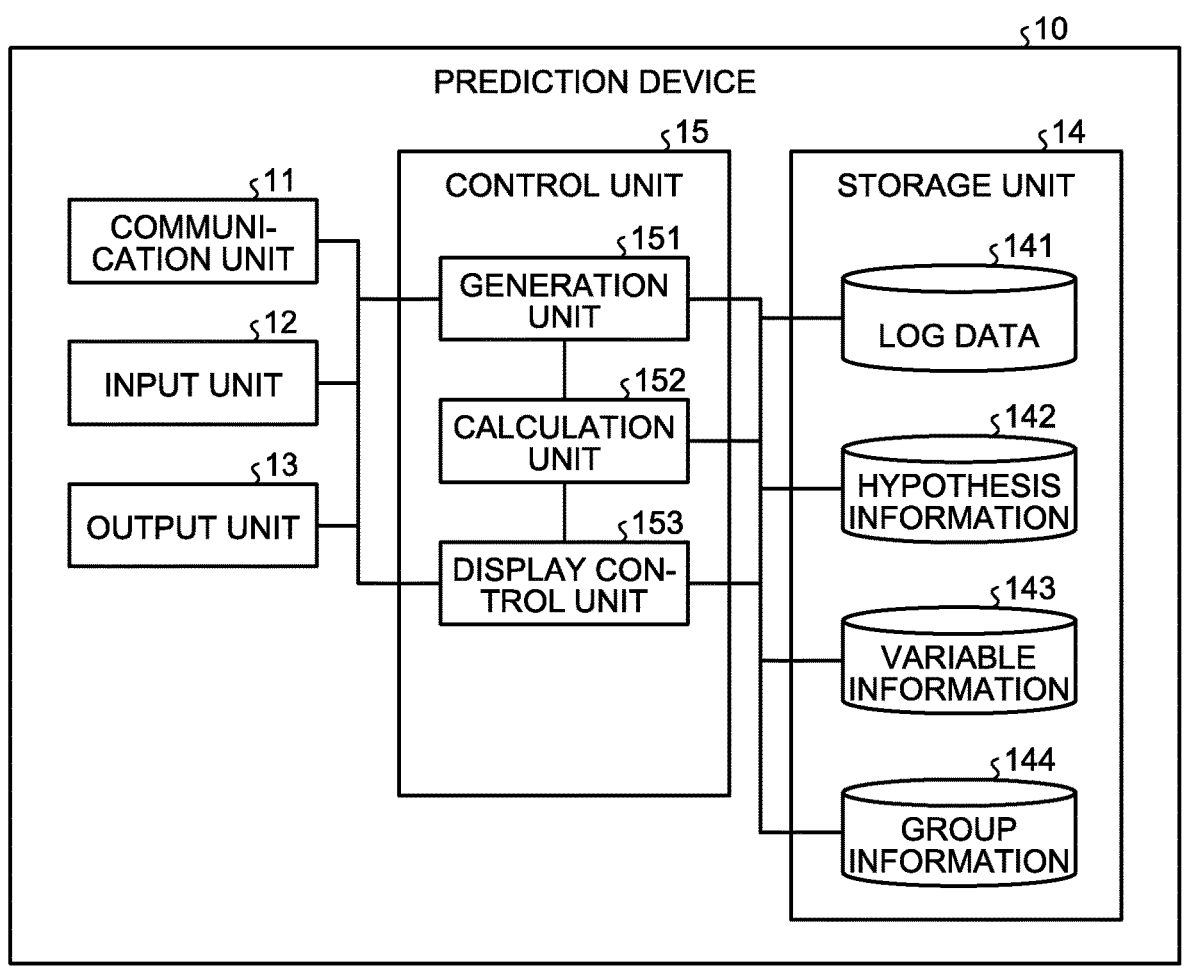
FIG. 1 is a diagram illustrating an example of the functional configuration of a prediction device according to a first embodiment.
Figure 6:
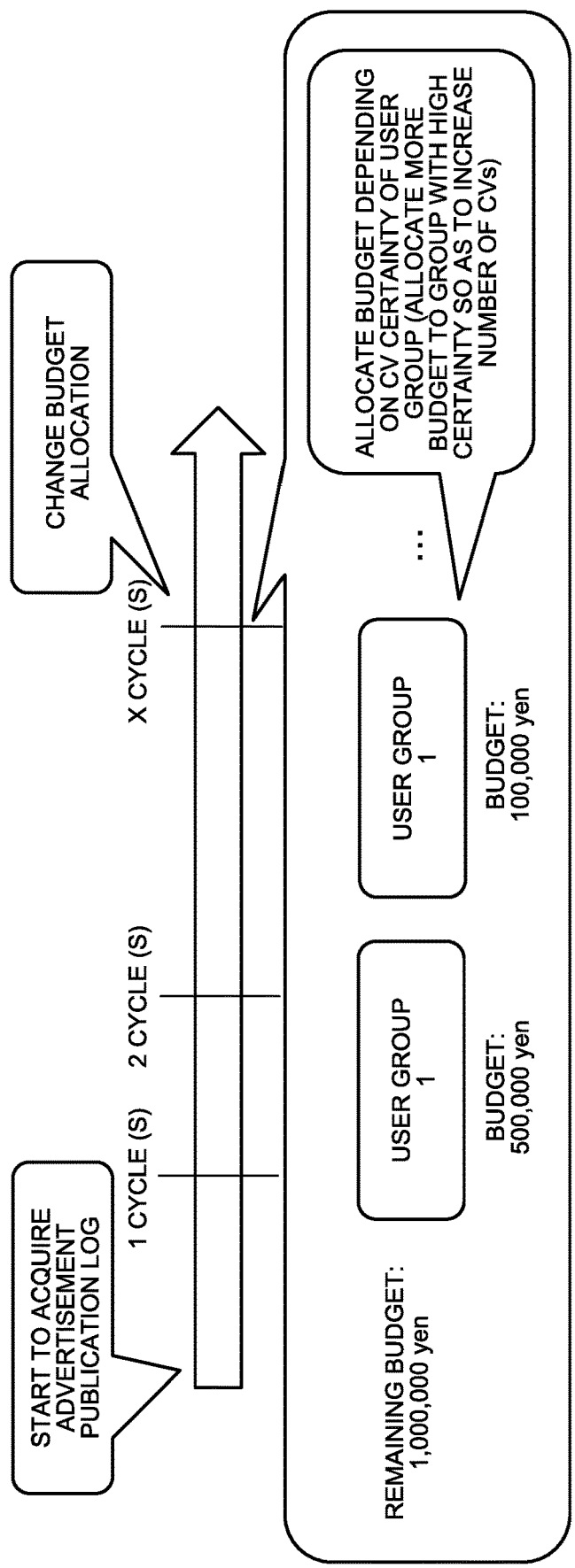
FIG. 6 is an explanatory view illustrating a cycle of budget allocation.
Figure 7:
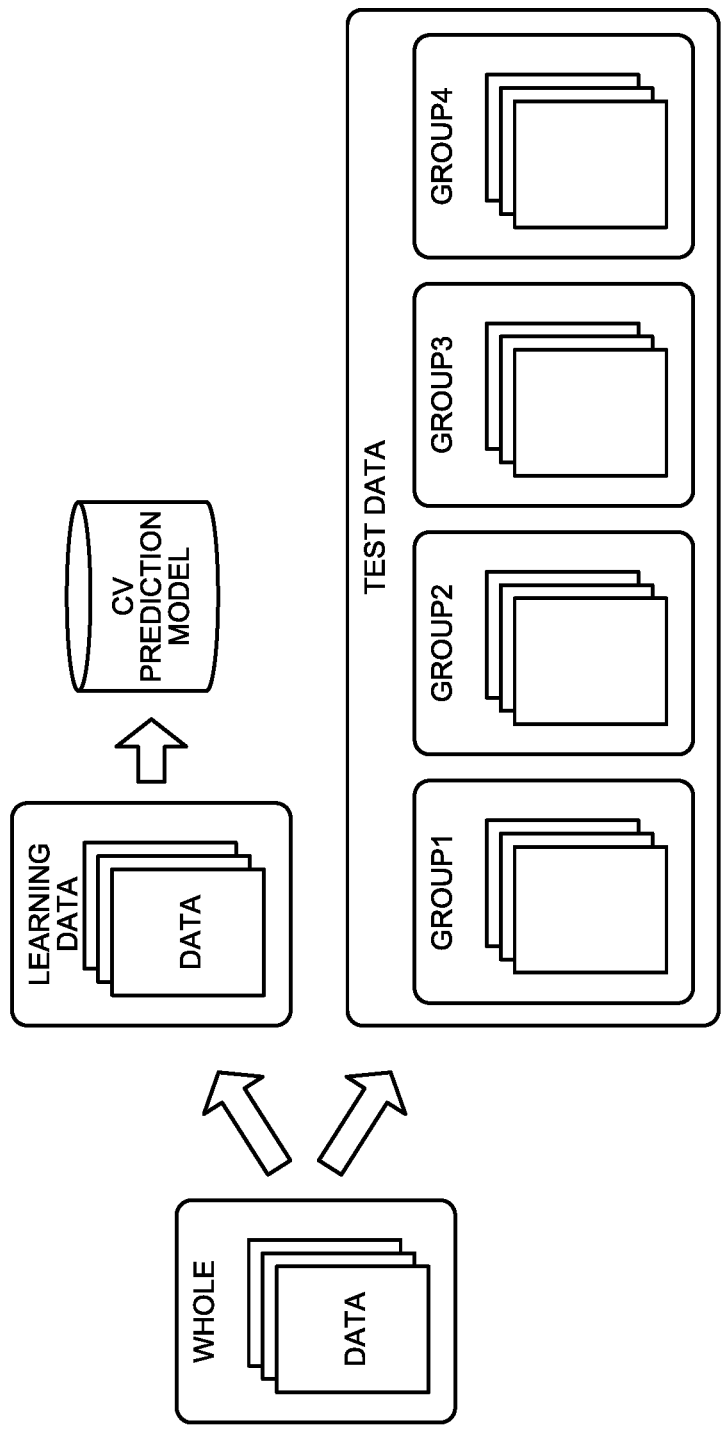
FIG. 7 is an explanatory view illustrating classification of data.

The functional configuration of a prediction device according to a first embodiment is described with FIG. 1. FIG. 1 is a diagram illustrating an example of the functional configuration of the prediction device according to the first embodiment. As illustrated in FIG. 1, a prediction device 10 includes a communication unit 11, an input unit 12, an output unit 13, a storage unit 14, and a control unit 15. The storage unit 14 stores therein log data 141, hypothesis information 142, variable information 143, and group information 144.

The log data 141 is used as training data for training a model for deriving a conversion (CV) rate. For example, the log data 141 is feature information on users and information indicating the presence or absence of purchase actions of commercial products or predetermined actions leading to the purchase actions by users. The information indicating the presence or absence of purchase actions of commercial products or predetermined actions leading to the purchase actions by users may be restated as information indicating whether users convert commercial products. The log data 141 can be referred to as data representing actual performance of CVs for each distributed advertisement.

A conversion (CV) indicates a term meaning that a result in marketing is achieved. Examples of the result in marketing include events that possibly become result indicators corresponding to contents of a published advertisement such as purchase and purchase reservation of commercial products, member registration, and inquiries regarding commercial products. The CV can also be referred to as an action leading to purchase of a commercial product and (occurrence of) positive movement with respect to purchase.

FIG. 2 is a diagram illustrating an example of log data. As illustrated in FIG. 2, the log data 141 includes "user identification (ID)", "gender", "age", "the number of times of access", "advertisement distribution time zone", and "place of residence" as explanatory variables. In addition, the log data 141 includes a "CV" as an objective variable. The objective variable "CV" represents whether a CV of the relevant advertisement occurs. For example, when a product corresponding to the relevant advertisement is purchased or a page moves to a purchase page of a product corresponding to the relevant advertisement, a CV is considered to occur.

For example, the first line in FIG. 2 indicates that gender of a user with user ID of "U001" is "female", age thereof is a "young person", a place of residence thereof is the "capital area", an advertisement distribution time zone thereof is "morning", the number of times of access thereof is 10 times, and a CV does not occur. For example, the second line in FIG. 2 indicates that gender of a user with user ID of "U002" is "male", age thereof is a "middle-aged person", a place of residence thereof is "Hokkaido", an advertisement distribution time zone thereof is "afternoon", the number of times of access thereof is 20 times, and a CV occurs.

The hypothesis information 142 is information in which a combination of an objective variable and a condition related to one or more explanatory variables corresponding to the objective variable is associated with an importance degree. Hereinafter, the combination in the hypothesis information 142 may be referred to as a hypothesis. A method for calculating the importance degree will be described later.

FIG. 3 is a diagram illustrating an example of hypothesis information. A hypothesis is generated based on log data. For example, the first line in FIG. 3 indicates that an importance degree of a hypothesis that a CV occurs when "gender=male ˆ the number of times of access ≥20 times ˆ a place of residence=Hokkaido" is 20. The importance degree with respect to a hypothesis is greater as possibility of occurrence of a CV is higher.

The variable information 143 is an importance degree for each variable. FIG. 4 is a diagram illustrating an example of the variable information. For example, the first line in FIG. 4 indicates that an importance degree of a variable "remaining budget" is 0.91. The importance degree for each variable may be calculated with the same method as the importance degree of a hypothesis, and may be calculated with a method different from that of the importance degree of a hypothesis. For example, the importance degree for each variable may be calculated with a well-known method such as logistic regression.

The group information 144 is classification conditions for classifying a hypothesis into groups. FIG. 5 is a diagram illustrating an example of the group information. As illustrated in FIG. 5, the group information 144 includes "group ID" and "classification conditions".

The control unit 15 includes a generation unit 151, a calculation unit 152, and a display control unit 153. The generation unit 151 performs learning processing. Specifically, the generation unit 151 generates a combination of conditions related to a plurality of item values included in data, in other words, a hypothesis. The generation unit 151 can generate a hypothesis from data including explanatory variables and an objective variable such as the log data 141. In this case, the generation unit 151 generates a combination of an objective variable and a condition related to one or more explanatory variables corresponding to the objective variable as a hypothesis.

Figure 8:
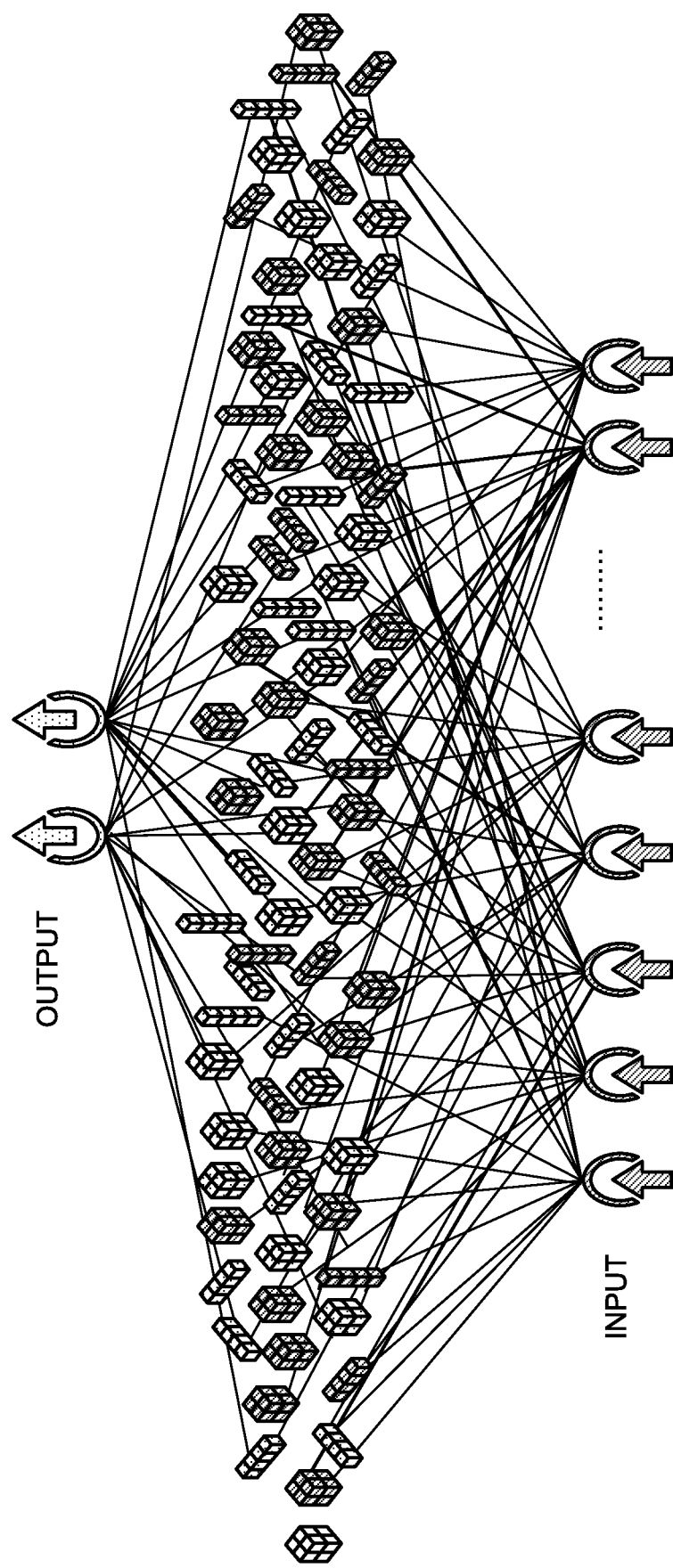
FIG. 8 is an explanatory view illustrating a learning method.
Figure 9:
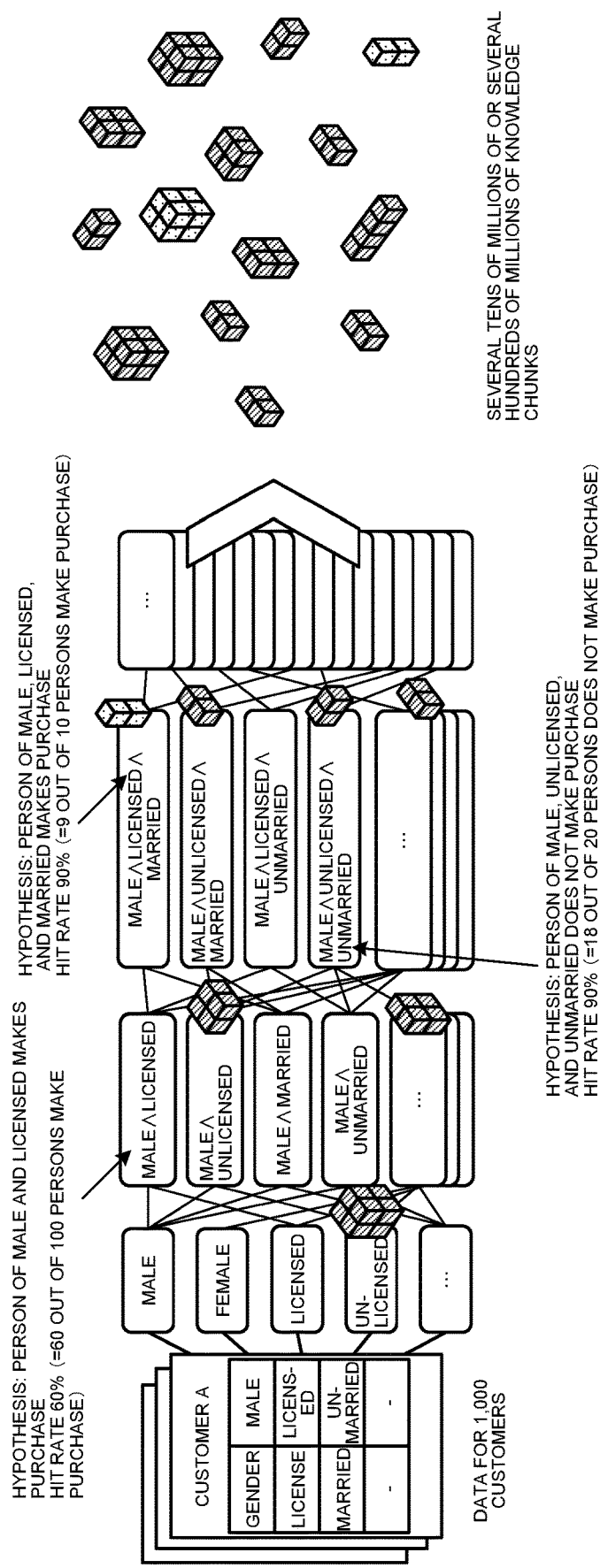
FIG. 9 is an explanatory view illustrating the learning method.

The following describes an example of a learning method by the generation unit 151 of the prediction device 10. The prediction device 10 generates a model obtained by combining a hypothesis with an importance degree through learning. FIGS. 8 and 9 are explanatory views illustrating the learning method. Generally, deep learning implements improvement in accuracy by adding several layers of neural networks imitating the configuration of a neural circuits of a human brain and refining one model. Thus, deep learning provides a complicated model that human beings are unable to understand. By contrast, as illustrated in FIG. 8, the prediction device 10 combines data items so as to extract a large amount of hypotheses, adjusts the importance degree of the hypotheses (knowledge chunks (hereinafter may be simply described as "chunks")), and executes machine learning (for example, wide learning) for building a highly accurate classification model. Each of the knowledge chunks is a simple model that human beings are able to understand and is a model describing a hypothesis capable of being established as input and output relation in logical terms.

Specifically, the prediction device 10 defines combination patterns of all data items in input data as hypotheses (chunks), and determines, with a hit rate of a classification label with respect to each hypothesis, the importance degree of the hypothesis. The prediction device 10 builds a model based on a plurality of extracted knowledge chunks and a label (objective variable). In this case, when items forming a knowledge chunk considerably overlap with items forming the other knowledge chunk, the prediction device 10 takes control so that the importance degree can be smaller.

A specific example is described with FIG. 9. In this case, an example for determining customers purchasing a certain commercial product and service is considered. Customer data has various kinds of items such as "gender", "presence or absence of a license", "marriage", "age", and "annual income". All combinations of these items are defined as hypotheses, and the importance degree of each of the hypotheses is considered. For example, in the data, there are 10 customers that are applicable to a hypothesis combining items of ""male", "licensed", and "married"". If 9 out of these 10 customers purchase a commercial product and the like, the hypothesis is defined as a hypothesis with a high hit rate that "a person of "male", "licensed", and "married" makes a purchase", and this hypothesis is extracted as a knowledge chunk. In this case, as an example, an indication of whether a commercial product is purchased in binary is defined as a label, in other words, an objective variable.

By contrast, in the data, there are 100 customers that are applicable to a hypothesis combining items of ""male" and "licensed"". When only 60 out of these 100 customers purchase a commercial product and the like, a hit rate for purchase is 60% and is less than a threshold (for example, 80). Thus, the hypothesis is defined as a hypothesis with a low hit rate that "a person of "male" and "licensed" makes a purchase", and this hypothesis is not extracted as a knowledge chunk.

In the data, there are 20 customers that are applicable to a hypothesis combining items of """male", "unlicensed", and "unmarried"". When 18 out of these 20 customers does not purchase a commercial product and the like, a hit rate for non-purchase is 90% and is equal to or more than a threshold (for example, 80). Thus, the hypothesis is defined as a hypothesis with a high hit rate that "a person of "male", "unlicensed", and "unmarried" does not make a purchase", and this hypothesis is extracted as a knowledge chunk.

In this manner, the prediction device 10 extracts several tens of millions of or several hundreds of millions of knowledge chunks for supporting purchase and knowledge chunks for supporting non-purchase, and executes learning of a model. The model learned in this manner lists a combination of features as a hypothesis (chunk). Each hypothesis has an importance degree that is an example of likelihood representing certainty added thereto, and the sum of the importance degree of hypotheses appearing in input data is defined as a score. If the score is equal to or more than a threshold, the model outputs the score as a positive example.

In other words, the score is an index indicating certainty of a state, and is the total value of the importance degree of, among chunks (hypotheses) generated as a model, chunks satisfying all of the features belonging to actions of a user and the like. For example, while "importance degree: 20 and features (A1 and A2)" is associated with a chunk A, "importance degree: 5 and features (B1)" is associated with a chunk B, and "importance degree: 10 and features (C1 and C2)" is associated with a chunk C, actions (A1, A2, B1, and C1) exist in a user log. In this case, all features of the chunks A and B appear, and the score is "20+5=25". In addition, the features correspond to actions of a user and the like.

Figure 10:
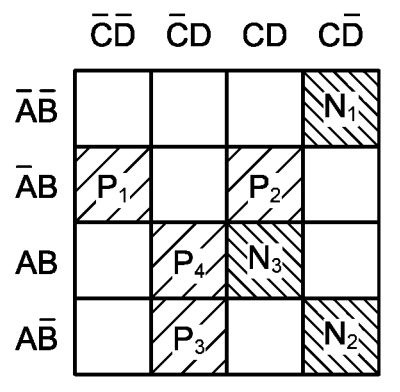

A method for generating a specific model by the generation unit 151 is described with FIGS. 10 to 14. FIG. 10 is an explanatory view illustrating relation between variables and data. As illustrated in FIG. 10, there are 4 conditions of A, B, C, and D as a condition related to each explanatory variable in the log data 141. In addition, a negation of A represents ⁻A (⁻ right above A). For example, when A represents a condition that "remaining budget exists", ⁻A represents a condition that "remaining budget does not exist". For example, when B represents a condition that "the number of clicks ≥100", ⁻B represents a condition that "the number of clicks <100".

$P_1$, $P_2$, $P_3$, $P_4$, $N_1$, $N_2$, and $N_3$ are data included in the log data 141, and represent data in which an objective variable is associated with a condition of an explanatory variable. In this case, $P_i$ represents data in which a value of an objective variable is "up", and $P_j$ represents data in which a value of an objective variable is "down" (but, i and j are any desired integers). As illustrated in FIG. 2, in the log data 141, values of an objective variable include "price maintenance" besides "up" and "down", but this case is described with two kinds of values of an objective variable as "up" and "down". Hereinafter, "up" and "down" may be referred to as + and −, respectively.

Figure 11:
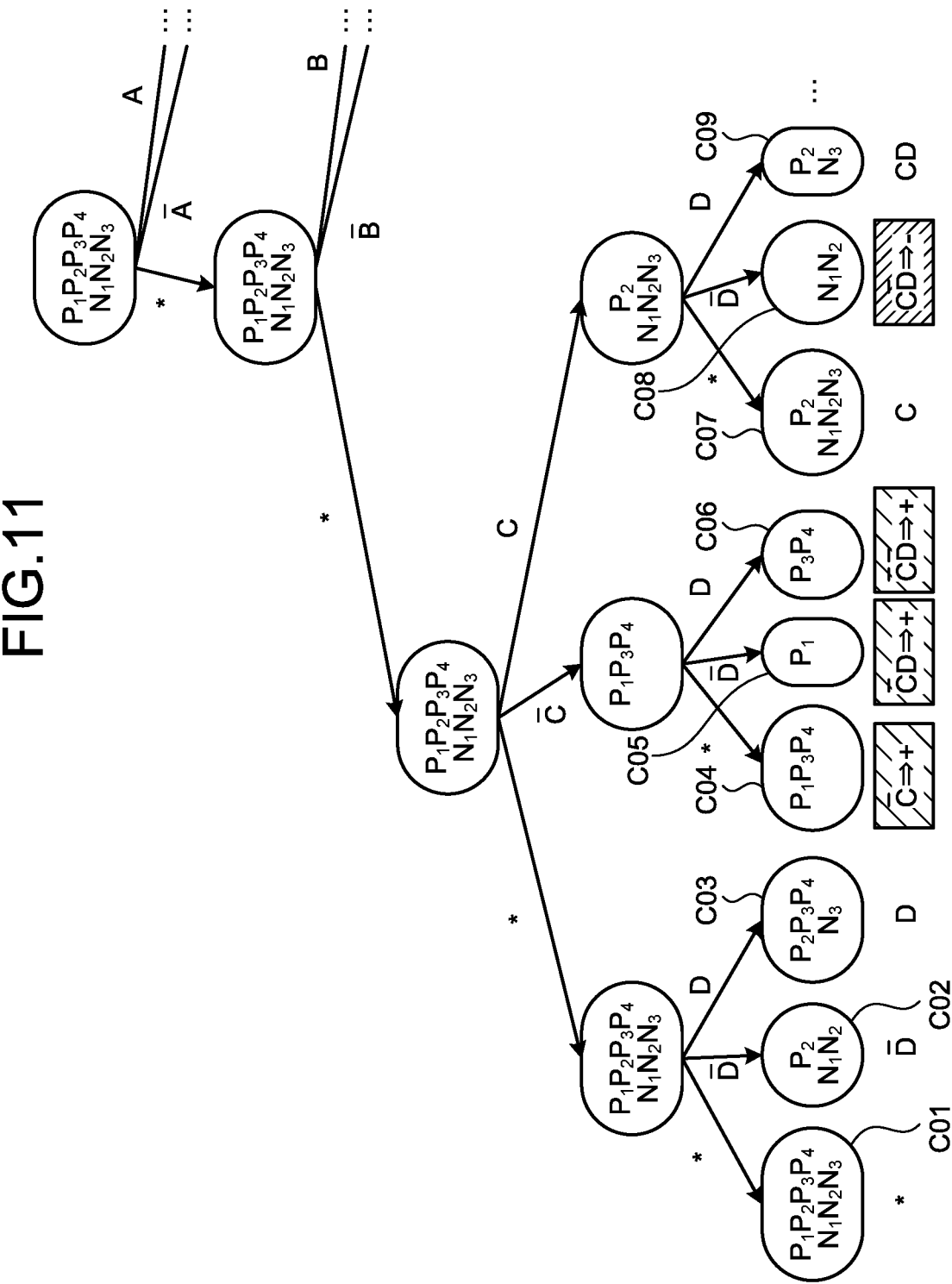
FIG. 11 is an explanatory view illustrating generation of hypotheses.

As illustrated in FIG. 11, the generation unit 151 exhaustively lists combinations of available values about the respective explanatory variables included in $P_1$, $P_2$, $P_3$, $P_4$, $N_1$, $N_2$, and $N_3$. FIG. 11 is an explanatory view illustrating generation of hypotheses. In this case, available values correspond to * (not use), 1 (use), and 0 (use a negation of a condition).

The generation unit 151 may limit the number of combined explanatory variables to a predetermined number or less. For example, when explanatory variables are four explanatory variables of A to D, the number of the combined explanatory variables may be limited to 2 or less. In this case, the generation unit 151 combines, among the four explanatory variables, at least two explanatory variables defined as * (not use). As the number of explanatory variables increases (for example 1,000), the number of combinations explosively increases. Thus, limitation can preliminarily prevent the number of listed combinations from increasing.

The generation unit 151 classifies whether a listed combination corresponds to $P_1$, $P_2$, $P_3$, $P_4$, $N_1$, $N_2$, or $N_3$ and is an effective combination satisfying a specific condition. For example, as the specific condition, a condition of explanatory variables is that the number of times of matching data of the log data 141 is a predetermined value or more. In this case, the generation unit 151 can generate, among conditions, a combination of the condition that the number of times of matching data is a predetermined value or more.

In the example in FIG. 11, the generation unit 151 lists a combination C01 having all of the four explanatory variables of A to D defined as *, a combination C04 defined as ⁻C, a combination C09 defined as CD (C and D are 1, and A and B are *), and the like.

As illustrated in FIG. 11, the generation unit 151 lists data corresponding to each of the combinations C01 to C09 based on the explanatory variables of $P_1$, $P_2$, $P_3$, $P_4$, $N_1$, $N_2$, and $N_3$. For example, the generation unit 151 lists $P_2$, $N_1$, and $N_2$ as data corresponding to the combination C02. In this case, in the data listed about the combination C02, data ($P_2$) the objective variable of which is + and data ($N_1$ and $N_2$) the objective variable of which is − are mixed. Because of the mixture, the combination C02 is less likely to be a hypothesis for properly describing whether the objective variable is + or −. Thus, the generation unit 151 does not adopt the combination C02 as an effective hypothesis.

By contrast, the generation unit 151 lists $N_1$ and $N_2$ as data corresponding to the combination C08. In this case, in the data listed about the combination C08, only data ($N_1$ and $N_2$) the objective variable of which is − exists. Thus, the generation unit 151 adopts the combination C08 as an effective hypothesis.

Even when different objective variables are mixed, the generation unit 151 may adopt a combination as an effective hypothesis depending on the proportion of the mixture. For example, if, for example, 80% of objective variables or more of data corresponding to a certain combination are +, the generation unit 151 may adopt the combination as an effective hypothesis.

In addition, the generation unit 151 removes a combination corresponding to a special case of a certain combination from a hypothesis. For example, the combinations C05 and C06 in FIG. 11 are special cases of the combination C04. The combinations C05 and C06 are merely the combination C04 to which a literal is added.

Figure 12:
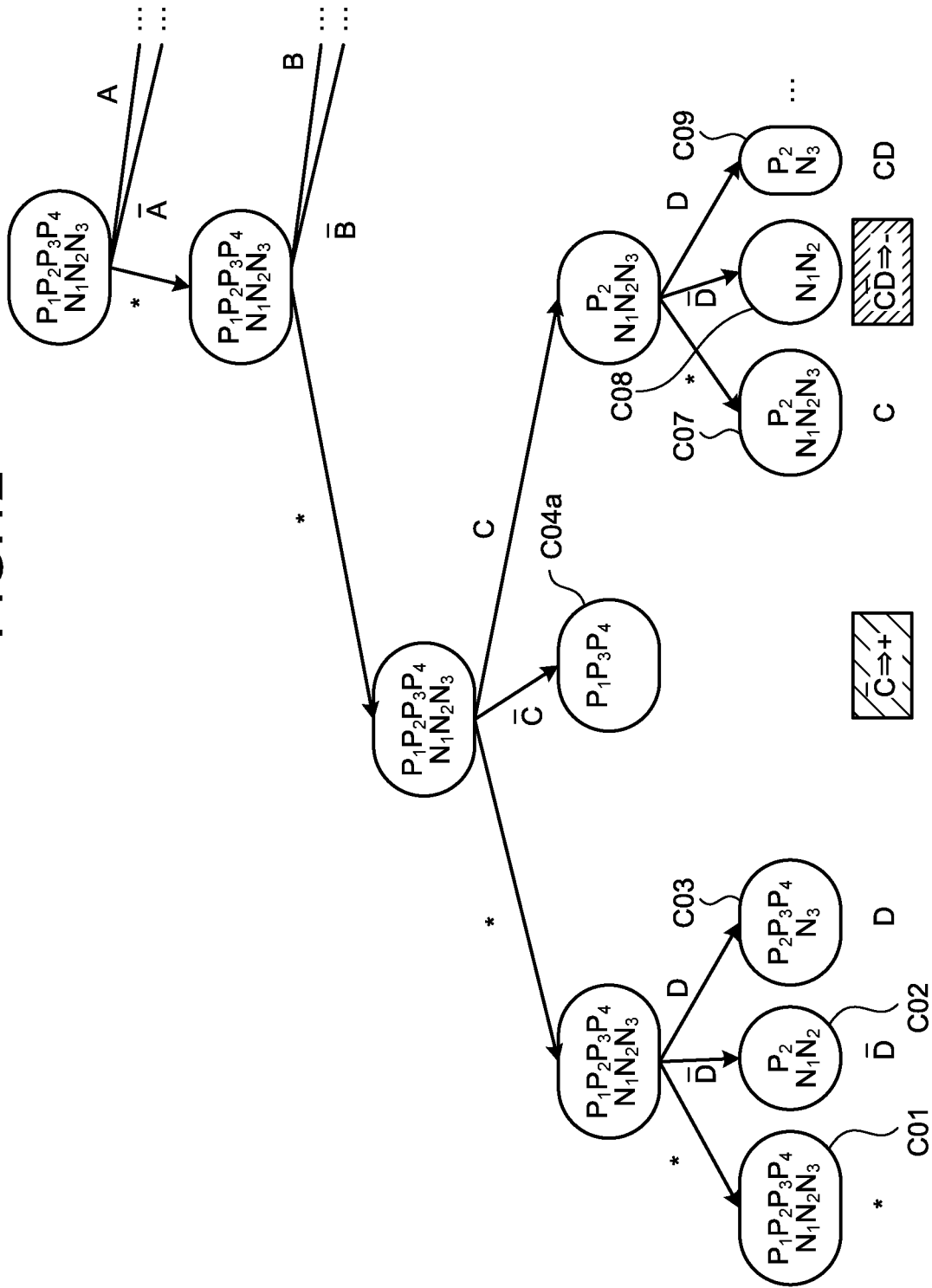
FIG. 12 is an explanatory view illustrating generation of the hypotheses.

The generation unit 151 adopts the combinations illustrated in FIG. 12 as hypotheses. FIG. 12 is an explanatory view illustrating generation of the hypotheses. In other words, the generation unit 151 adopts the combinations C01, C02, C03, C04a, C07, C08, and C09 as hypotheses. The combination C04a is, among the combinations satisfying ⁻C, the combination from which special cases of the combination C04 are omitted.

Figure 13:
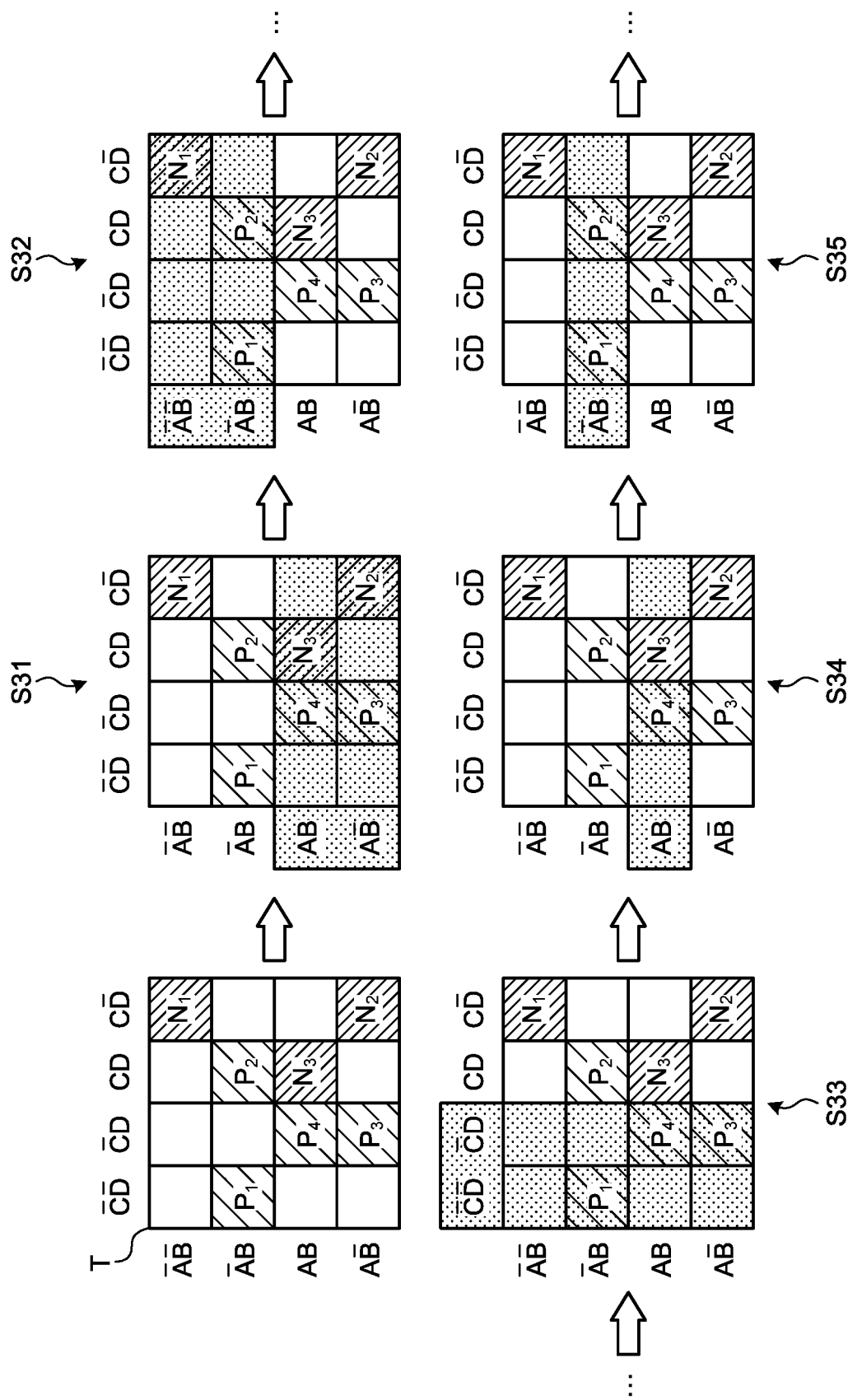
FIG. 13 is an explanatory view illustrating generation of the hypotheses.

FIG. 13 is an explanatory view illustrating generation of the hypotheses. FIG. 13 is contents of FIGS. 11 and 12 each illustrated by the Karnaugh map. As illustrated in FIG. 13, the generation unit 151 changes the combinations in the order of the combination (S31) of A (B, C, and D are * (not use)), the combination (S32) of $^-$A (B, C, and D are * (not use)), and the like, and reviews an effective combination (S31 to S35 and the like).

For the combinations of $^-$C at S33, data ($P_1$, $P_3$, and $P_4$) the objective variable of which is + is applicable. In other words, at S33, the number or proportion of pieces of data classified into a + class ($P_1$, $P_3$, and $P_4$) is a predetermined value or more. The generation unit 151 determines the combinations of $^-$C at S33 as effective combinations (hypotheses) classified into a + class. In the following processing, a combination of $^-$C to which a literal is added is removed.

Subsequently, the generation unit 151 starts to review the combinations in which two explanatory variables are defined as * (not use) after reviewing all combinations in which three explanatory variables are defined as * (not use) (S34). In this case, for the combinations of A$^-$B at S35, training data ($P_1$ and $P_2$) the objective variable of which is defined as + is applicable. In other words, at S35, the number or proportion of pieces of training data ($P_1$ and $P_2$) classified into a + class is a predetermined value or more. Thus, the generation unit 151 determines the combinations of A$^-$B at S35 as effective combinations (hypotheses) classified into a + class.

Figure 14:
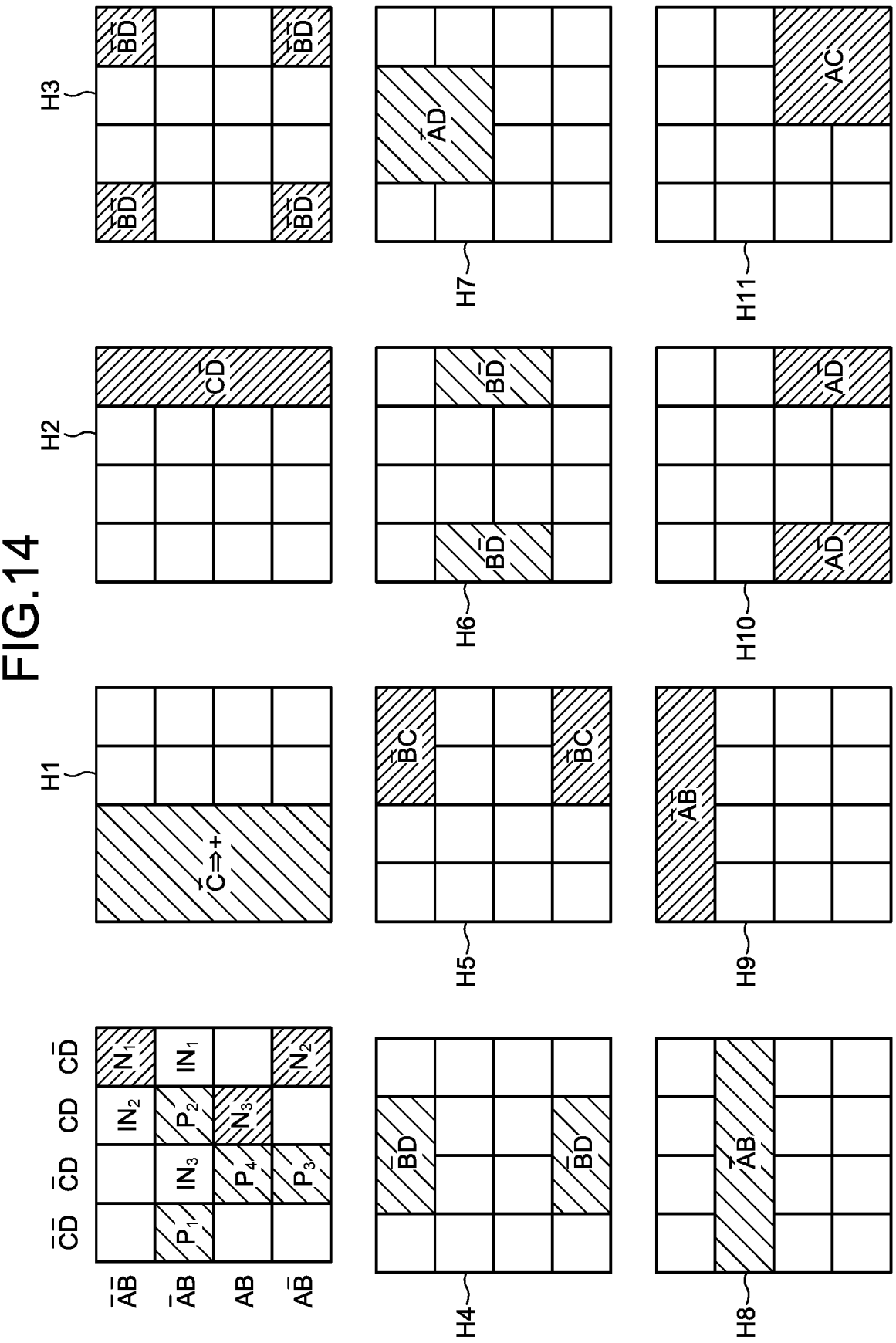
FIG. 14 is an explanatory view illustrating an example of generated hypotheses.

FIG. 14 is an explanatory view illustrating an example of generated hypotheses. As illustrated in FIG. 14, the generation unit 151 generates hypotheses H1 to H11 the classification result of which is + or − from $P_1$, $P_2$, $P_3$, $P_4$, $N_1$, $N_2$, and $N_3$, and stores the generated hypotheses as the hypothesis information 142 in the storage unit 14.

Each of the hypotheses H1 to H11 is an independent hypothesis having a requirement of properly explaining that a classification result of each data is + or −. Thus, hypotheses inconsistent with each other such as the hypotheses H2 and H6 may exist.

Figure 15:
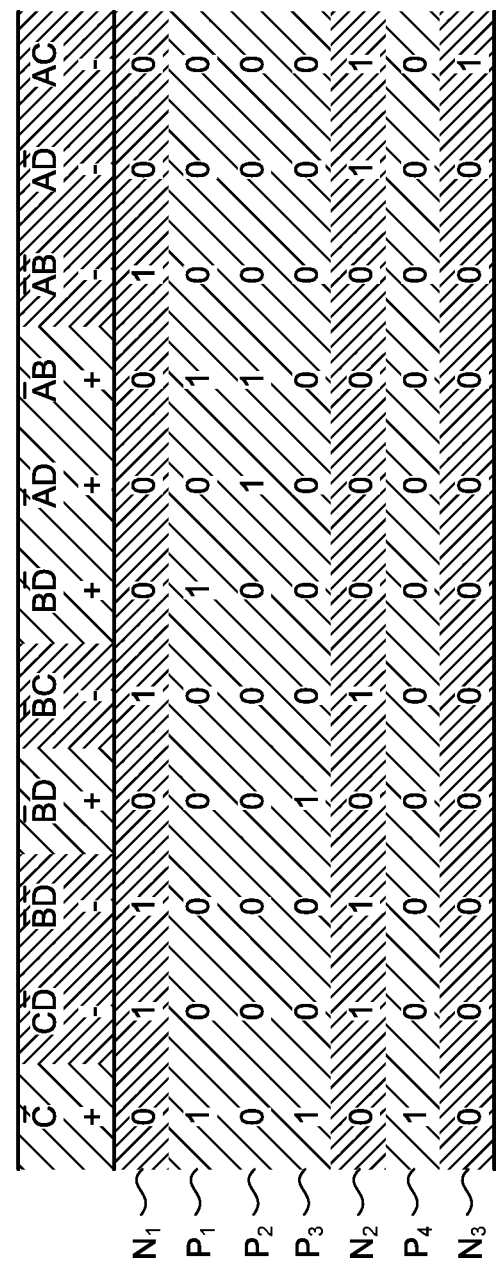
FIG. 15 is an explanatory view illustrating calculation of the importance degree by logistic regression.

The calculation unit 152 calculates the importance degree that represents a degree of co-occurrence in data for each combination. For example, the calculation unit 152 calculates the importance degree of each hypothesis by logistic regression. FIG. 15 is an explanatory view illustrating calculation of the importance degree by logistic regression. The calculation unit 152 applies the log data 141 to the model expression illustrated in FIG. 15 so as to calculate optimum coefficients $\beta_1$ to $\beta_{11}$. The calculation unit 152 updates the importance degree of the hypothesis information 142 with the calculated coefficients.

In this case, the importance degree for each hypothesis is greater as co-occurrence in the log data 141 is greater. In addition, the importance degree can be referred to as likelihood of an objective variable when a condition of each explanatory variable is satisfied. Thus, the calculation unit 152 calculates, for each combination, likelihood of an objective variable with respect to satisfaction of a condition as the importance degree.

In the present embodiment, a model can predict the presence or absence of CVs for each group based on the score obtained from an explanatory variable of test data. The presence or absence of CVs can be referred to as the presence or absence of purchase actions of commercial products or predetermined actions leading to the purchase actions by users. For example, a model predicts that a CV occurs (CV) when a score is + and predicts that a CV does not occur (not CV) when the score is −.

In other words, the generation unit 151 generates, using data in which feature information on users is associated with information indicating whether users convert commercial products as learning data, a model that predicts the presence or absence of CVs of users depending on the feature information on users.

Figure 16:
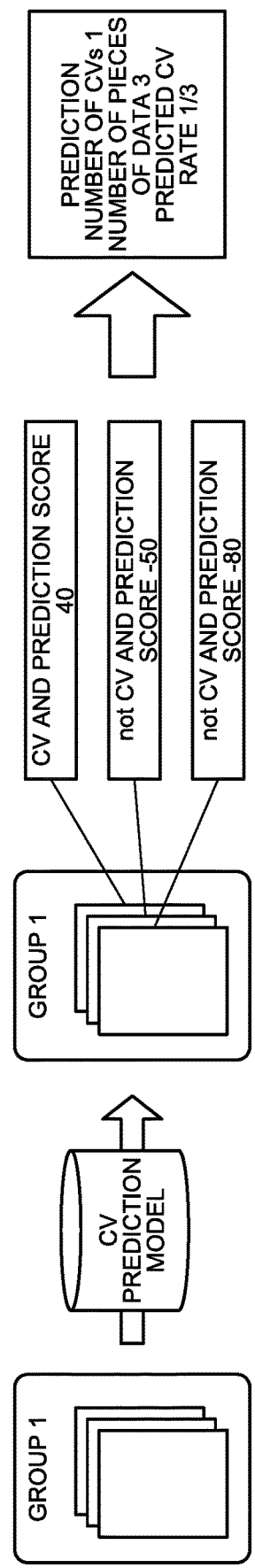
FIG. 16 is an explanatory view illustrating prediction.
Figures 17, 18:
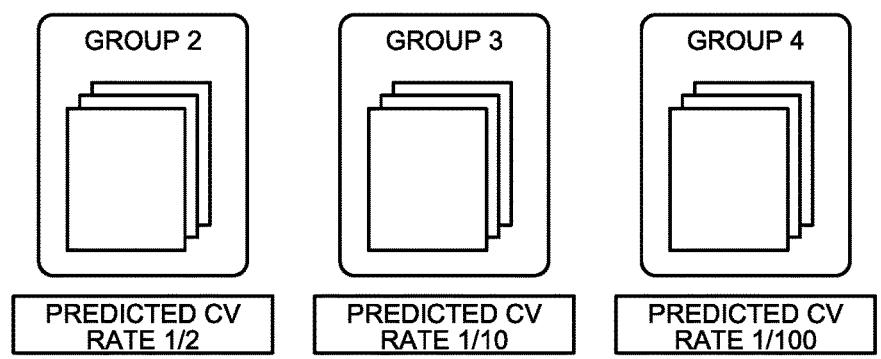
FIG. 17 is an explanatory view illustrating prediction.
FIG. 18 is a view illustrating an example of a prediction result display screen.

The calculation unit 152 calculates, using an already learned model, a predicted occurrence rate (hereinafter, a predicted CV rate) that is an occurrence rate of purchase actions or predetermined actions and the predicted frequency of occurrence (hereinafter, the prediction number of CVs) that is the frequency of occurrence of purchase actions or predetermined actions from the presence or absence of CVs and the number of pieces of data. FIG. 16 is an explanatory view illustrating prediction. As illustrated in FIG. 16, the calculation unit 152 calculates a predicted CV rate and the prediction number of CVs from the average of scores for each group. As illustrated in FIG. 17, the calculation unit 152 also calculates a predicted CV rate of the other groups in the same way as the group 1. FIG. 17 is an explanatory view illustrating prediction.

The display control unit 153 displays feature information on users of a group corresponding to an entry field, a budget amount input in the entry field, the prediction number of clicks to an advertisement page of a commercial product, and the prediction number of CVs calculated based on a predicted CV rate calculated using a model, in association with the budget amount on a display unit. The output unit 13 is an example of the display unit.

As illustrated in FIG. 18, the display control unit 153 displays an entry field, the prediction number of clicks, and the prediction number of CVs as a prediction result display screen. FIG. 18 is a view illustrating an example of the prediction result display screen.

The predicted CV rate in FIG. 18 is a value that the calculation unit 152 calculates using an already learned model. The calculation unit 152 calculates a predicted CV rate based on the presence or absence of CVs obtained by inputting the feature information on the users of the group in the model. The display control unit 153 displays the prediction number of CVs calculated based on the predicted CV rate calculated by the calculation unit 152. For example, the prediction number of CVs is calculated by, for example, the prediction number of clicks×a predicted CV rate.

The prediction number of clicks is calculated from an actual performance click rate and budget allocation. The input unit 12 receives input of a budget amount in the entry field displayed on the display unit in association with a group of some of the users having common parts in feature information. The display control unit 153 displays the prediction number of clicks and the prediction number of CVs depending on the input budget amount for each line. The display control unit 153 updates and displays the prediction number of clicks and the prediction number of CVs whenever a budget amount is changed.

For example, in the example in FIG. 18, an actual performance click rate of the group 1 is "3" per 1 yen. If budget allocation is "1,000 yen", the display control unit 153 calculates the prediction number of clicks as "3,000" by "3×1,000".

In addition, the display control unit 153 displays the prediction number of CVs calculated based on the prediction number of clicks based on an actual performance value of the number of clicks to an advertisement page. For example, the display control unit 153 calculates and displays the prediction number of clicks×a predicted CV rate as the prediction number of CVs.

A prediction result display screen may be a Web page, may be a table of spreadsheet software, or may be a dedicated application. For example, in FIG. 18, each cell in a budget allocation column is a text box in which a user can input a numerical value. Each cell in columns other than the budget allocation is displayed only.

For example, at a timing when "1,000" is input in a cell in the budget allocation of the group 1 or at a timing when a cursor is separated from the cell, the display control unit 153 displays "3,000" in the prediction number of clicks, and "1,000" in the prediction number of CVs. Because a cell in the budget allocation of the group 4 is blank, the display control unit 153 leaves cells in the prediction number of clicks and the prediction number of CVs of the group 4 blank. When a value input in a cell in the budget allocation is deleted, the display control unit 153 makes cells in the prediction number of clicks and in the prediction number of CVs corresponding to the deleted cell blank.

Flow of Processing

Figure 19:
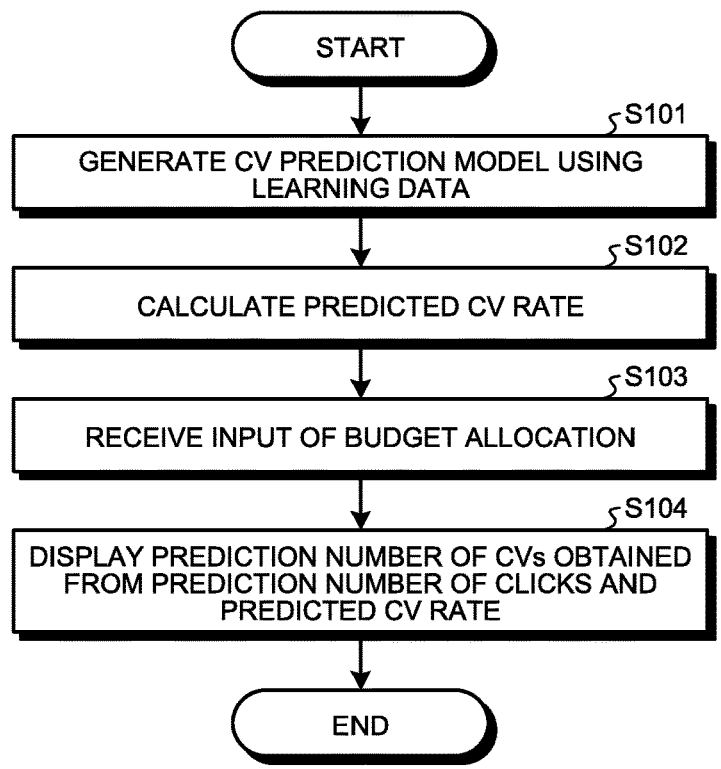
FIG. 19 is a flowchart illustrating a flow of prediction processing according to the first embodiment.

FIG. 19 is used for describing a flow of processing by the prediction device 10. FIG. 19 is a flowchart illustrating a flow of extraction processing according to the first embodiment. As illustrated in FIG. 19, the prediction device 10 generates a CV prediction model using learning data (step S101). The prediction device 10 calculates a predicted CV rate for each group using the model (step S102).

In addition, the prediction device 10 receives input of budget allocation (step S103). The prediction device 10 displays the prediction number of CVs obtained by the prediction number of clicks and a predicted CV rate (step S104).

Effect

As described above, the prediction device 10 generates a model using data in which feature information on users is associated with information indicating the presence or absence of purchase actions of commercial products or predetermined actions leading to the purchase actions by the users as learning data. The model predicts the presence or absence of purchase actions or predetermined actions of the users corresponding to feature information on the users. The prediction device 10 receives input of a budget amount in an entry field displayed on the display unit in association with a group of some of the users having common parts in the feature information. The prediction device 10 displays the feature information on the users of the group corresponding to the entry field, a budget amount input in the entry field, the prediction number of clicks to an advertisement page of a commercial product, and the predicted frequency of occurrence calculated based on a predicted occurrence rate, in association with the budget amount on the display unit. Thus, according to the embodiment, the prediction number of CVs for each group is calculated and displayed depending on designation of budget allocation so as to make optimization of the budget allocation more efficient.

The prediction device 10 calculates, with a model, a predicted CV rate based on the presence or absence of CVs obtained by inputting feature information on users of a group in the model. The prediction device 10 displays the prediction number of CVs calculated based on the calculated predicted CV rate. In this manner, the prediction device 10 can display not only the prediction number of CVs but also the predicted CV rate.

The prediction device 10 displays the prediction number of CVs calculated based on the prediction number of clicks based on actual performance value for the number of clicks to an advertisement page. Thus, the prediction number of CVs can be obtained with greater accuracy.

Explanatory variables are not limited to the ones illustrated in FIG. 4 and the like. For example, the generation unit 151 generates a model that predicts the presence or absence of CVs of users depending on feature information on users including an elapsed time from an initial access time to an advertisement page. In other words, explanatory variables may include a date and time of the initial access to an advertisement page, a date and time of the second and subsequent access to the advertisement page, an access cycle to the advertisement page, and the like. This is because there is a user that, for example, takes a certain amount of time from the initial access to an advertisement page and accesses the advertisement page again so as to reach a CV.

Items displayed by the display control unit 153 are not limited to the ones illustrated in FIG. 18. For example, the display control unit 153 may remove, among the items in FIG. 18, an actual performance CV rate, an actual performance click rate, and a predicted CV rate. In addition, the display control unit 153 may display a variability rate of the prediction number of CVs per budget 1 yen in addition to the items in FIG. 18.

System

Except as otherwise specifically described, any desired modifications can be made on processing procedures illustrated in the specifications and drawings, control procedures, specific names, and information including various kinds of data and parameters. Specific examples, distribution, numerical values, and the like described in the embodiment are an example, and any modifications can be made on them.

Each component in each of the illustrated devices is something functionally conceptual, and is not necessarily configured physically as illustrated. In other words, a specific embodiment of distributing/integrating each of the devices is not limited to the illustrated one. In other words, all of or a part of the devices can be configured to be functionally or physically distributed/integrated in a certain unit depending on various kinds of loads, use situations, and the like. In addition, all of or a certain part of the processing function executed by each of the devices may be implemented by a central processing unit (CPU) and a computer program analyzed and executed by the CPU, or may be implemented as hardware of the wired logic.

Hardware

Figure 20:
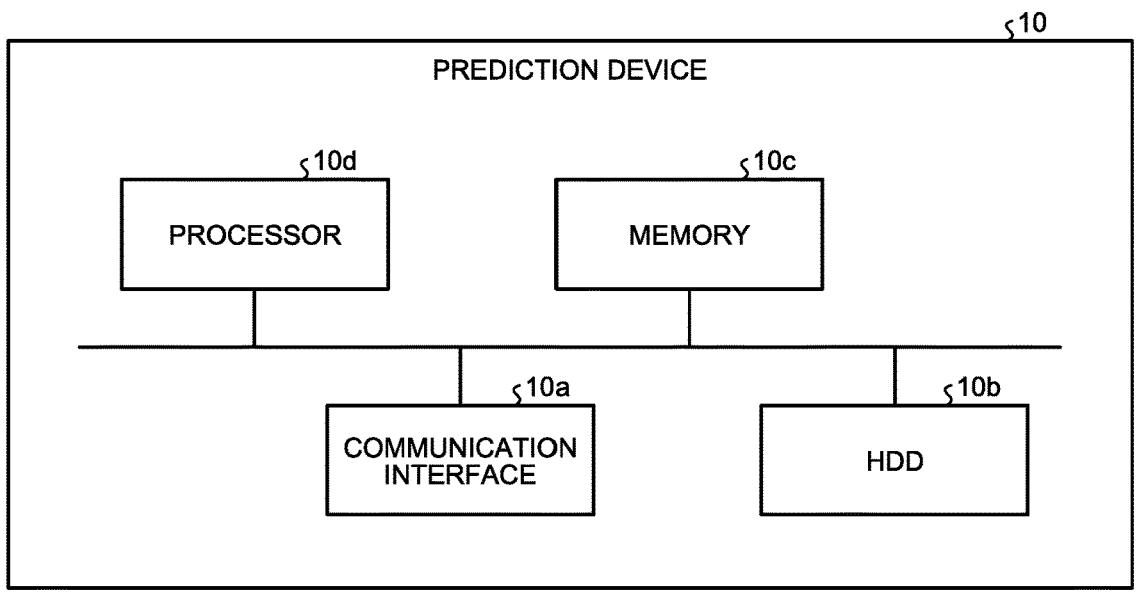
FIG. 20 is a diagram illustrating a hardware configuration example.

FIG. 20 is a diagram illustrating a hardware configuration example. As illustrated in FIG. 20, the prediction device 10 includes a communication interface 10a, a hard disk drive (HDD) 10b, a memory 10c, and a processor 10d. Each of the units illustrated in FIG. 20 is mutually connected through a bus and the like.

The communication interface 10a is a network interface card and the like, and communicates with the other server. The HDD 10b stores therein a computer program causing functions illustrated in FIG. 1 to be operated and a database (DB).

The processor 10d reads a computer program that executes the same processing as that of each processing unit illustrated in FIG. 1 from the HDD 10b and the like and loads the computer program to the memory 10c so as to operate a process executing each function illustrated in FIG. 1 and the like. In other words, this process executes the same function as that of each processing unit included in the prediction device 10. Specifically, the processor 10d reads a computer program having the same functions as those of the generation unit 151, the calculation unit 152, and the display control unit 153 from the HDD 10b or the like. The processor 10d executes a process executing the same processing as that of the generation unit 151, the calculation unit 152, the display control unit 153, and the like. Examples of the processor 10d include a CPU, a micro processing unit (MPU), a hardware circuit such as an application specific integrated circuit (ASIC).

In this manner, the prediction device 10 operates as an information processing device that reads and executes a computer program so as to execute a classification method. In addition, the prediction device 10 causes a medium reading device to read the computer program described above from a recording medium, and executes the read computer program so as to implement the same function as that in the embodiment described above. Execution of a computer program in the other embodiments is not limited to the execution by the prediction device 10. For example, when the other computer or server executes a computer program and when the other computer and server cooperate with each other and execute a computer program, the present invention is applicable in the same manner.

This computer program can be distributed through a network such as the Internet. In addition, this computer program may be recorded in computer-readable recording media such as a hard disk, a flexible disk (FD), a compact disc read-only memory (CD-ROM), a magneto-optical disk (MO), and a digital versatile disc (DVD), and may be read from the recording media by a computer so as to be executed.

According to one aspect, the present invention can make optimization of budget allocation more efficient.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a prediction program that causes a computer to execute a process comprising:
   extracting information indicative of hypotheses that a ratio of presence of purchase actions of commercial products or conversions from log data that records information indicating the purchase actions of commercial products or the conversions of users corresponding to feature information on the users including gender, age, and place of residence, satisfies conditions of a plurality of thresholds,
      a conversion, among the conversions, indicating achievement of a result in marketing in form of the users whose feature information being consistent with a hypothesis, among the hypotheses, resulting in each of a plurality of prediction items becoming a score indicative of certainty of a state of the achievement of the result in marketing;
   training a machine learning model by using training data that satisfied the conditions of the plurality of thresholds, the machine learning model predicting presence or absence of purchase actions of commercial products, or information indicating conversions of users corresponding to feature information on the users;
   receiving input of a budget amount in an entry field displayed on a display in association with a user group of users including a common feature in the feature information; and
   displaying, in association with the budget amount on the display,
      feature information on the users in the user group corresponding to the entry field,
      the budget amount input in the entry field,
      a prediction number of clicks to an advertisement page of the commercial products, and
      a predicted frequency of occurrence that is a frequency of occurrence of the purchase actions or the conversions calculated based on a predicted occurrence rate, the predicted occurrence rate being an occurrence rate of the purchase actions or the conversion calculated by using the machine learning model.

2. The non-transitory computer-readable recording medium according to claim 1, wherein
   the process further includes calculating the predicted occurrence rate based on the presence or absence of the purchase actions or the conversions of users obtained by inputting the feature information on the users of the group in the model, wherein
   the displaying includes displaying the predicted frequency of occurrence calculated based on the predicted occurrence rate calculated at the calculating.

3. The non-transitory computer-readable recording medium according to claim 1, wherein the displaying includes displaying the predicted frequency of occurrence calculated based on the prediction number of clicks based on an actual performance value of a number of clicks to the advertisement page.

4. The non-transitory computer-readable recording medium according to claim 1, wherein the machine learning model predicts the presence or absence of the purchase actions or the conversion based on the feature information including an elapsed time from an initial access time to an advertisement page.

5. A prediction method executed by a computer, the prediction method comprising:
   extracting information indicative of hypotheses that a ratio of presence of purchase actions of commercial products or conversions from log data that records information indicating the purchase actions of commercial products or the conversions of users corresponding to feature information on the users including gender, age, and place of residence, satisfies conditions of a plurality of thresholds,
      a conversion, among the conversions, indicating achievement of a result in marketing in form of the users whose feature information being consistent with a hypothesis, among the hypotheses, resulting in each of a plurality of prediction items becoming a score indicative of certainty of a state of the achievement of the result in marketing;
   obtaining a machine learning model trained by using training data that satisfies the condition of the plurality of thresholds, the machine learning model predicting presence or absence of purchase actions of commercial products, or information indicating conversions of users corresponding to feature information on the users;
   receiving input of a budget amount in an entry field displayed on a display in association with a user group of users including a common feature in the feature information; and displaying, in association with the budget amount on the display,
  feature information on the users in the user group corresponding to the entry field,
  the budget amount input in the entry field,
  a prediction number of clicks to an advertisement page of the commercial products, and
  a predicted frequency of occurrence that is a frequency of occurrence of the purchase actions or the conversions calculated based on a predicted occurrence rate, the predicted occurrence rate being an occurrence rate of the purchase actions or the conversions calculated by using the machine learning model.

6. A prediction device comprising:
a processor configured to:
  information indicative of hypotheses that a ratio of presence of purchase actions of commercial products or conversions from log data that records information indicating the purchase actions of commercial products or the conversions of users corresponding to feature information on the users including gender, age, and place of residence, satisfies conditions of a plurality of thresholds,
    a conversion, among the conversions, indicating achievement of a result in marketing in form of the users whose feature information being consistent with a hypothesis, among the hypotheses, resulting in each of a plurality of prediction items becoming a score indicative of certainty of a state of the achievement of the result in marketing;
  train a machine learning model trained by using training data that satisfies the conditions of the plurality of thresholds, the machine learning model predicting presence or absence of purchase actions of commercial products, or information indicating conversions of users corresponding to feature information on the users;
  receive input of a budget amount in an entry field displayed on a display in association with a user group of users including a common feature in the feature information; and
  display, in association with the budget amount on the display,
    feature information on the users in the user group corresponding to the entry field,
    the budget amount input in the entry field,
    a prediction number of clicks to an advertisement page of the commercial products, and
    a predicted frequency of occurrence that is a frequency of occurrence of the purchase actions or the conversions calculated based on a predicted occurrence rate, the predicted occurrence rate being an occurrence rate of the purchase actions or the conversions calculated by using the machine learning model.

* * * * *